US011853563B1

(12) United States Patent
Avraham et al.

(10) Patent No.: US 11,853,563 B1
(45) Date of Patent: Dec. 26, 2023

(54) KEY VALUE DATA STORAGE DEVICE WITH TIERS (71) Applicant: Western Digital Technologies, Inc., San Jose, CA (US)

(72) Inventors: David Avraham, Even Yehuda (IL); Alexander Bazarsky, Holon (IL); Ran Zamir, Ramat Gan (IL)

(73) Assignee: Western Digital Technologies, Inc., San Jose, CA (US)

( * ) Notice: Subject to any disclaimer, the term of this patent is extended or adjusted under 35 U.S.C. 154(b) by 41 days.

(21) Appl. No.: 17/843,629

(22) Filed: Jun. 17, 2022

(51) Int. Cl.
*G06F 12/00* (2006.01)
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| 11,216,334 | B1* | 1/2022 | Wang ...................... G06F 3/061 |
| 2016/0171033 | A1 | 6/2016 | Konik et al. |
| 2017/0220572 | A1 | 8/2017 | Ding et al. |
| 2019/0057140 | A1* | 2/2019 | Pitchumani ........... G06F 3/0614 |
| 2019/0129876 | A1 | 5/2019 | Trika |
| 2019/0340183 | A1 | 11/2019 | Bussler et al. |
| 2020/0125410 | A1 | 4/2020 | Karmarkar et al. |
| 2022/0164134 | A1* | 5/2022 | Lee ........................ G06F 3/0659 |
| 2022/0291858 | A1* | 9/2022 | DeWitt ............... G06F 12/0253 |
| 2023/0131251 | A1* | 4/2023 | Edo Vivancos ...... G06F 3/0608 711/170 |
| 2023/0208448 | A1* | 6/2023 | Avraham ............ H03M 13/356 714/763 |

OTHER PUBLICATIONS

Kim, et al., The Key to Value: Understanding the NVMe Key-Value Standard, Live Website, Sep. 1, 2020, SNIA NSF, Networking Storage, 31 pp.
Adams, NVMe® Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al, NVM Express Technical Proposal for New Feature, Jun. 2020, NVM Express, Inc., 34 pp.

* cited by examiner

*Primary Examiner* — John A Lane
(74) *Attorney, Agent, or Firm* — PATTERSON + SHERIDAN, LLP; Steven H. VerSteeg (57) ABSTRACT

A data storage device includes a memory device and a controller coupled to the memory device. The controller is configured to receive key value (KV) pair data from a host device, where the KV pair data includes a key and a value, determine whether the KV pair data corresponds to a first tier or a second tier, where the second tier has a lower performance requirement than the first tier, and program the value of the KV pair data as padding data when the KV pair data corresponds to the second tier. The determining is based on a received hint of the KV pair data, a relative performance of the KV pair data, and a length of the KV pair data. The controller is configured reclassify the KV pair data based on a read frequency of the KV pair data.

20 Claims, 5 Drawing Sheets

FIG. 1

| COMMAND | DESCRIPTION |
|---|---|
| DELETE | DELETE THE KEY AND VALUE ASSOCIATED WITH SPECIFIED KEY |
| LIST | LISTS KEYS THAT EXIST IN A KEY VALUE NAMESPACE STARTING AT A SPECIFIED KEY |
| RETRIEVE | RETRIEVE THE VALUE ASSOCIATED WITH A SPECIFIED KEY |
| EXIST | RETURNS A STATUS INDICATING WHETHER A KEY VALUE EXISTS FOR A SPECIFIED KEY |
| STORE | STORES A KEY VALUE TO A KEY VALUE NAMESPACE |

FIG. 2B

| KEY 202 |
|---|
| VALUE 204 |

KEY VALUE DATA STORAGE DEVICE WITH TIERS

BACKGROUND OF THE DISCLOSURE

Field of the Disclosure

Embodiments of the present disclosure generally relate to data storage devices, such as solid state drives (SSDs), and, more specifically, optimization of data alignment by associating key value (KV) pair data with tiers and programming the KV pair data to a memory device based on the tier of the KV pair data in KV data storage devices.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a data storage device using a key rather than a block address.

Because the value length of the KV pair data may vary between 0 bytes to 4 GB, the value length may not match an optimized FMU size. Thus, aligning the KV pair data to the boundaries of the FMU may lead to a loss of space (low utilization) or cause data fragmentation, which may impact random read performance.

Therefore, there is a need in the art for an improved data alignment for KV data storage devices.

SUMMARY OF THE DISCLOSURE

The present disclosure generally relates to data storage devices, such as solid state drives (SSDs), and, more specifically, optimization of data alignment by associating key value (KV) pair data with tiers and programming the KV pair data to a memory device based on the tier of the KV pair data in KV data storage devices. A data storage device includes a memory device and a controller coupled to the memory device. The controller is configured to receive key value (KV) pair data from a host device, where the KV pair data includes a key and a value, determine whether the KV pair data corresponds to a first tier or a second tier, where the second tier has a lower performance requirement than the first tier, and program the value of the KV pair data as padding data when the KV pair data corresponds to the second tier. The determining is based on a received hint of the KV pair data, a relative performance of the KV pair data, and a length of the KV pair data. The controller is configured reclassify the KV pair data based on a read frequency of the KV pair data.

In one embodiment, a data storage device includes a memory device and a controller coupled to the memory device. The controller is configured to receive key value (KV) pair data from a host device, where the KV pair data includes a key and a value, determine whether the KV pair data corresponds to a first tier or a second tier, where the second tier has a lower performance requirement than the first tier, and program the value of the KV pair data as padding data when the KV pair data corresponds to the second tier.

In another embodiment, a data storage device includes a memory device and a controller coupled to the memory device. The controller is configured to receive first KV pair data from a host device, where KV pair data includes a key and a value, classify the received first KV pair data as a first tier, program the received first KV pair data to a first flash management unit (FMU), where the received first KV pair is less than a full size of a FMU, receive second KV pair data from the host device, classify the second KV pair data as a second tier, where the second tier has a lower performance requirement than the first tier, and program at least a portion of the second KV pair data in an FMU that has KV pair data classified as the first tier previously stored in the FMU.

In another embodiment, a data storage device includes memory means and a controller coupled to the memory means. The controller is configured to program data associated with a second tier to one or more FMUs. The one or more flash management units (FMUs) comprises key value (KV) pair data associated with a first tier. The first tier has a higher performance requirement than the second tier. The data associated with the second tier is utilized as padding data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
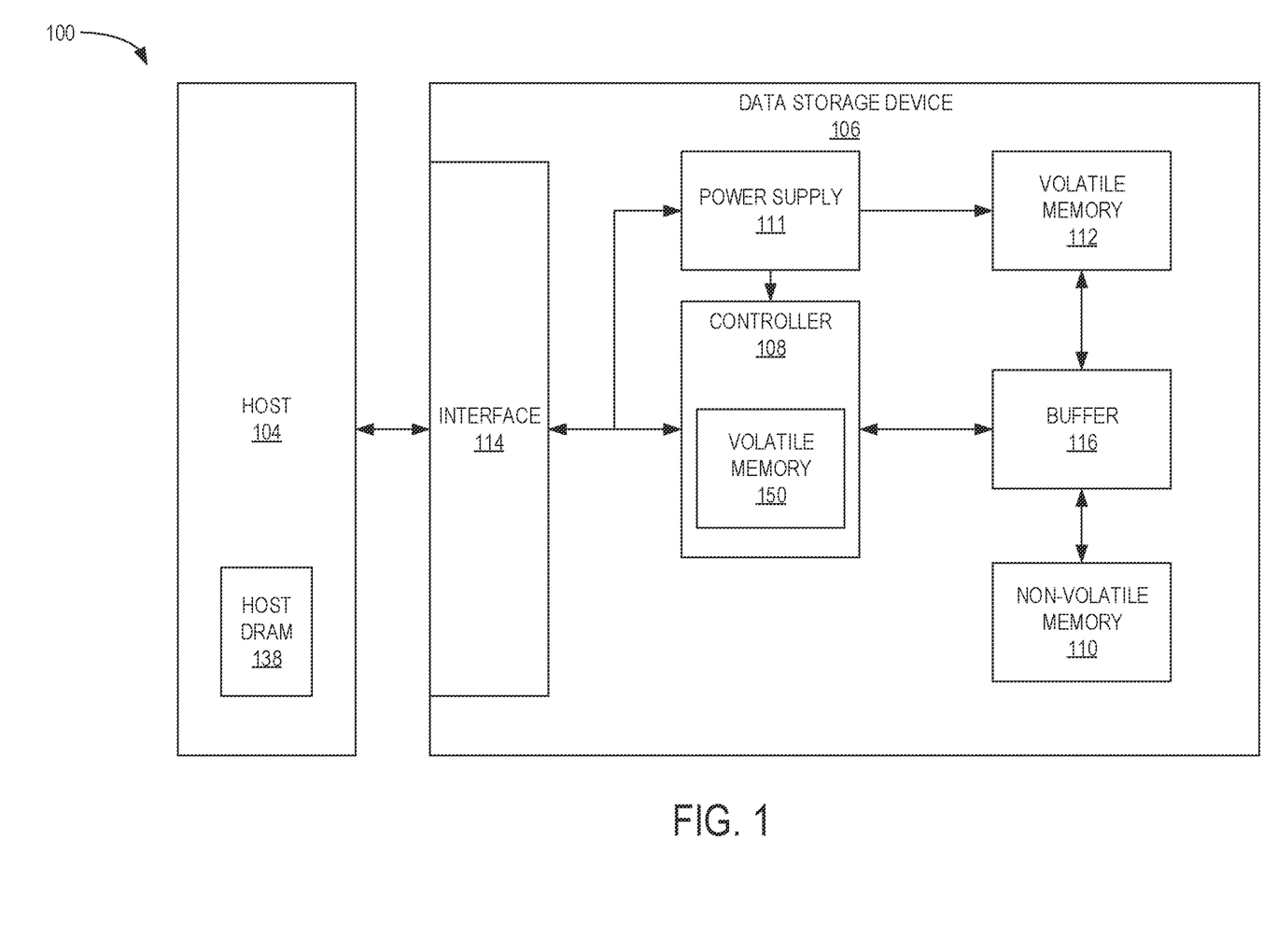
FIG. 1 is a schematic block diagram illustrating a storage system in which a data storage device may function as a storage device for a host device, according to certain embodiments.

The present disclosure generally relates to data storage devices, such as solid state drives (SSDs), and, more specifically, optimization of data alignment by associating key value (KV) pair data with tiers and programming the KV pair data to a memory device based on the tier of the KV pair data in KV data storage devices. A data storage device includes a memory device and a controller coupled to the memory device. The controller is configured to receive key value (KV) pair data from a host device, where the KV pair data includes a key and a value, determine whether the KV pair data corresponds to a first tier or a second tier, where the second tier has a lower performance requirement than the first tier, and program the value of the KV pair data as padding data when the KV pair data corresponds to the second tier. The determining is based on a received hint of the KV pair data, a relative performance of the KV pair data, and a length of the KV pair data. The controller is configured reclassify the KV pair data based on a read frequency of the KV pair data FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory 150), which may be SRAM memory, prior to sending the data to the NVM 110.

Figure 2A:
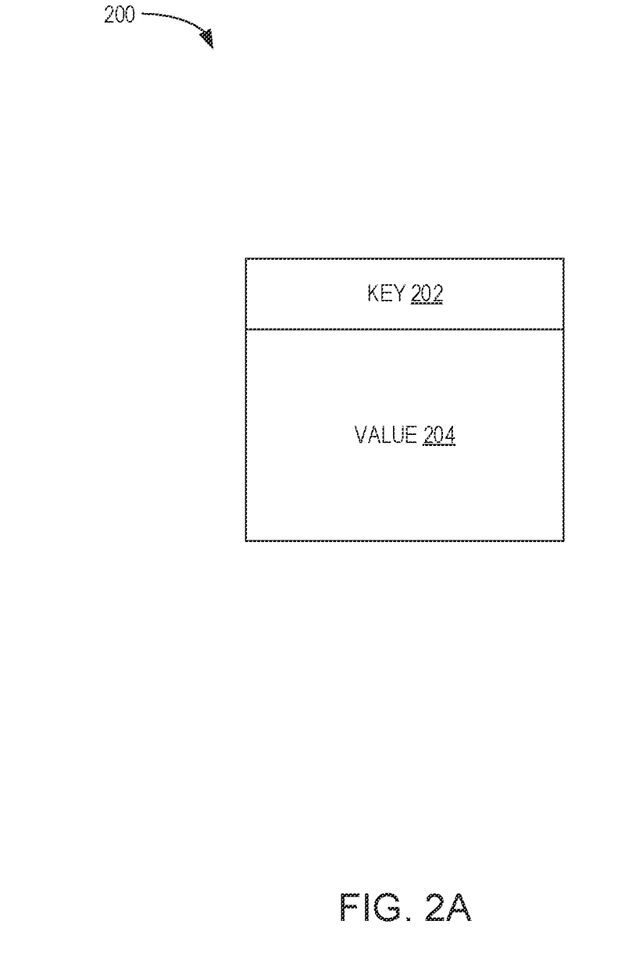
FIG. 2A is an exemplary illustration of a KV pair data, according to certain embodiments.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about 232-1 bytes. For example, when the value 204 has a size of about 0 bytes, the value 204 is an empty value. It is to be understood that the previously mentioned values are not intended to be limiting, but to provide an example of an embodiment.

Figure 2B:
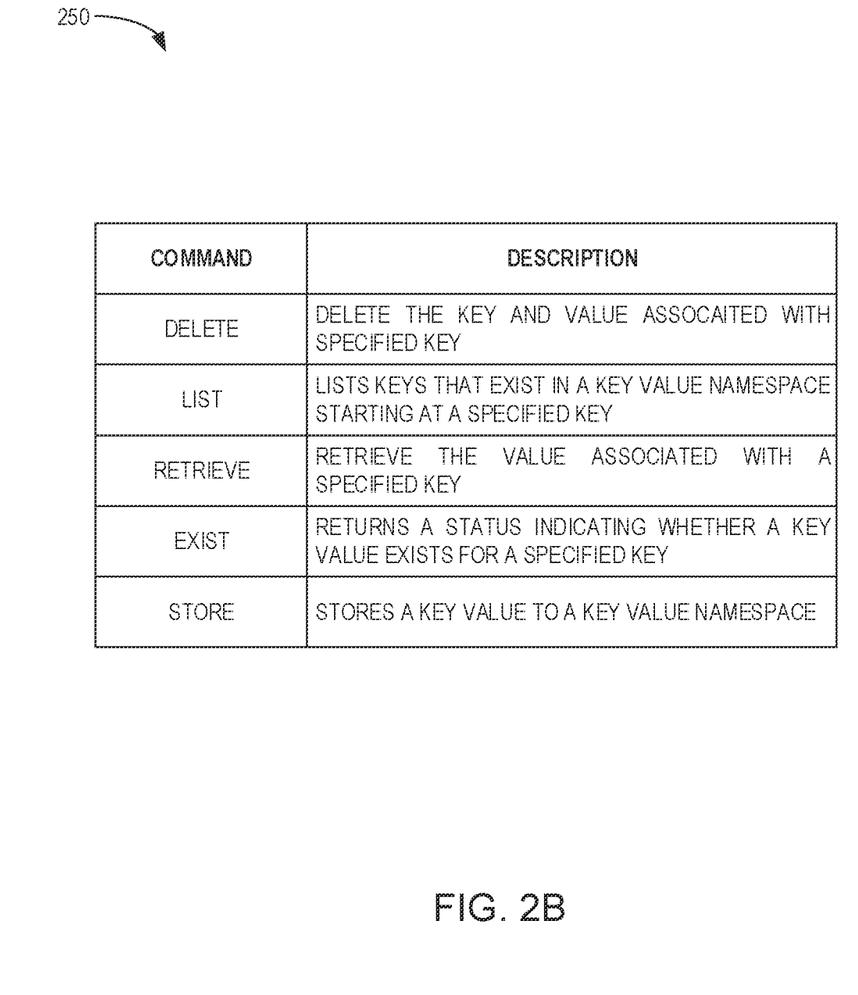
FIG. 2B is a table illustrating a command set for a KV database, according to certain embodiments.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

In the KV system, there may be one or more KV formats present, each with a different set of KV sizes and properties. Furthermore, each KV format may have a relative performance (RP) requirement which may dictate where the KV pair data is stored in the NVM 110. It is to be understood that the term "requirement" may refer to a general guideline, such that the controller 108 may attempt to program KV pair data in the RP specified wordlines or blocks, but may also program the KV pair data in adjacent RP groups to the RP requirement. Blocks of the NVM 110 may be classified according to conditions that relate to the health of the block. For example, conditions relating to the health of the block may include, but not limited to, a number of program erase cycles (PEC), a bit error rate (BER) severity, a physical location of a wordline on the block, and an amount of time exceeding a temperature threshold or thresholds. Wordlines near an edge of the block may exhibit higher BER than wordlines near the middle of the block.

Therefore, blocks and/or wordlines of the blocks may be logically grouped into performance groups. For example, there may be four groups where a first group has the highest performance, a second group has a performance lower than the first group, a third group has a performance lower than the second group, and a fourth group has a performance lower than the third group. An example of RP values is shown in Table 1 below.

TABLE 1

| Value | Definition |
|---|---|
| 00b | Best Performance |
| 01b | Better Performance |
| 10b | Good Performance |
| 11b | Degraded Performance |

When storing KV pair data, the value of the KV pair data may be divided between wordlines and blocks of the NVM 110 that have different health properties in order to ensure that overall read throughput is not impaired due to random placement across the blocks. Additionally, prioritization of values may be incorporated. For example, values with a higher RP requirement are placed in blocks that have a first health and values with a lower RP requirement are placed in blocks that have a second health, where the first health is greater than the second health. For example, the first health may be associated with "best performance" or "00b" of Table 1 and the second health may be associated with "better performance" or "01 b" of Table 1 above.

Figure 3A:
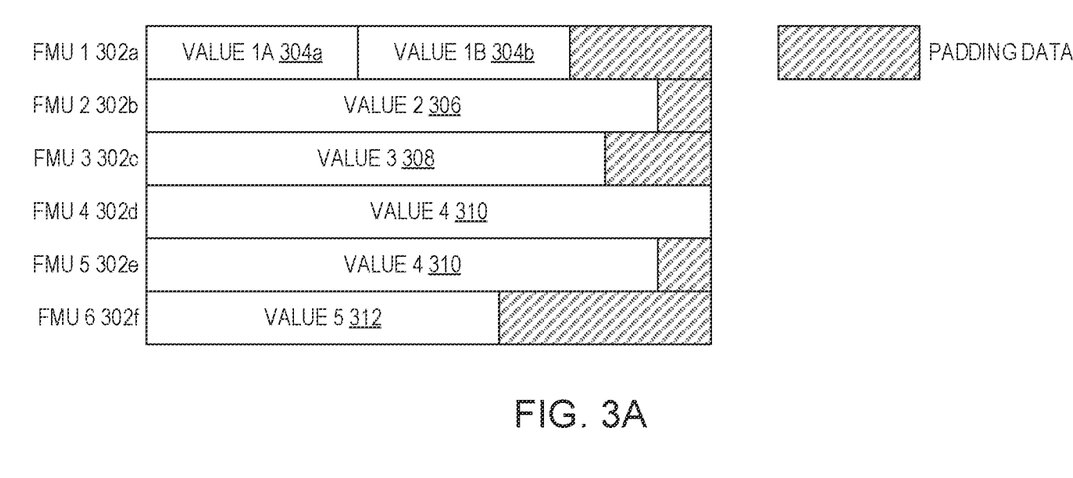
FIG. 3A is a schematic illustration of alignment by padding of a plurality of FMUs storing a plurality of values, according to conventional embodiments.

FIG. 3A is a schematic illustration of alignment by padding of a plurality of FMUs 302a-302f storing a plurality of values 304a-312, according to conventional embodiments. The alignment by padding may occur in an opportunistic manner, such that when KV pair data (i.e., the value of the KV pair data) is programmed to the memory device, such as the NVM 110 of FIG. 1, the data of the values may be aggregated in an opportunistic manner. For example, data may be written to the memory device in a similar manner to writing random writes to the memory device in conventional data storage devices by aggregating values of the KV pair data and padding the data to fit a flash management unit (FMU). Each FMU may have a size of about 4 KB. The previously listed size is not intended to be limiting, but to provide an example of a possible embodiment.

As shown in FIG. 3A, each value is programmed to its own FMU. However, the values may not require a full FMU, thus, remaining space in the FMU is available. In order to better protect the data stored in each FMU, a controller, such as the controller 108 of FIG. 1, may program padding data to the remaining space in the FMU in order to close the FMU. For example, in FMU 1 302a, value 1A 304a and value 1B 304b do not fill the entirety of FMU 1 302a. In other words, the cumulative size of value 1A 304a and value 1B 304b is less than about 4 KB. Padding data may include non-relevant data, dummy data, invalid data, and the like.

The controller 108 programs padding data to the remaining space (i.e., 4 KB minus cumulative size of value 1A 304a and value 1B 304b) in FMU 1 302a to fill and close FMU 1 302a. Likewise, padding data is added to FMU 2 302b, FMU 3 302c, FMU 5 302e, and FMU 6 302f due to value 2 306, value 3 308, value 4 310, and value 5 312 not filling an FMU to capacity. Furthermore, for optimization purposes, each value is allotted its own FMU in order to improve random read performance. However, the capacity of the data storage device may be impacted due to available space being used to store padding data.

Figure 3B:
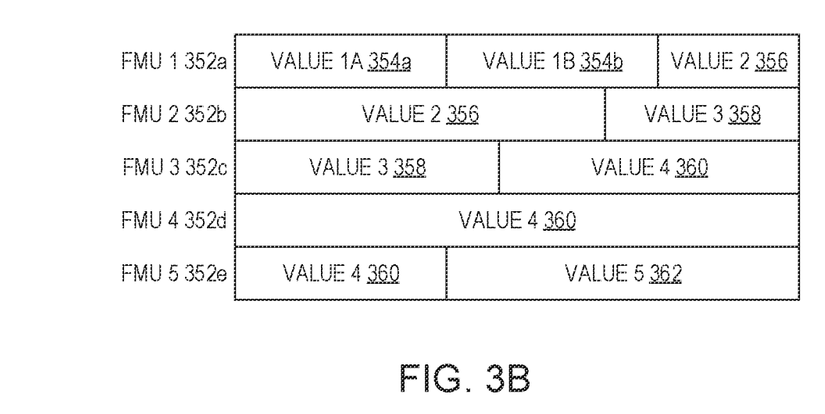
FIG. 3B is a schematic illustration of alignment by data split of a plurality of FMUs storing a plurality of values, according to conventional embodiments.

FIG. 3B is a schematic illustration of alignment by data split of a plurality of FMUs 352a-352n storing a plurality of values 354a-362, according to conventional embodiments. Each FMU may have a size of about 4 KB. The previously listed size is not intended to be limiting, but to provide an example of a possible embodiment. Because each of the plurality of values 354a-362 may not require a full FMU, the plurality of values 354a-362 may be aggregated and programmed to one or more FMUs, where data of a value may partially be in two or more FMUs. For example, because the cumulative size of value 1a 354a and value 1b 354b is less than a size of FMU 1 352a, the remaining capacity of FMU 1 352a is used to program value 2 356. However, not all of value 2 356 is able to be programmed to FMU 1 352a. The remaining portion of value 2 356 is programmed to FMU 2 352b. Although available space, such as shown in FIG. 3A, is not used to store padding data, random read performance may be impacted as extra transfers and decode operations may needed in order to retrieve a value stored in an FMU.

Figure 4:
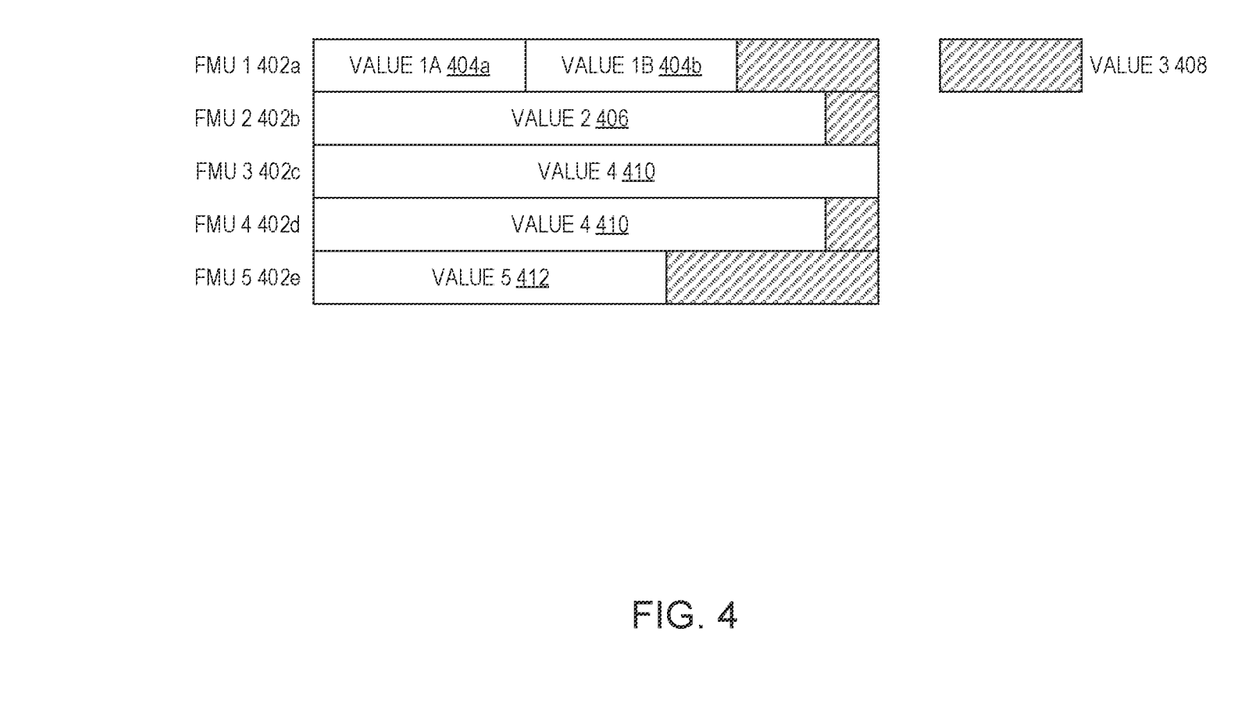
FIG. 4 is a schematic illustration of alignment by padding using KV pair data of a plurality of FMUs storing a plurality of values, according to certain embodiments.

FIG. 4 is a schematic illustration of alignment by padding using KV pair data of a plurality of FMUs 402a-402e storing a plurality of values 404a-412, according to certain embodiments. KV protocols allow for flexible value lengths, which may vary from several bytes to up to 4 GBs. The length of the value may correspond to the type of the host object. For example, objects may be large videos or data files, which may result in long values. In another example, images, music, documents may have a moderately sized value, which may be a few MBs. In yet another example, shorter objects may correspond to leaves in larger data structures, log entries, and the like. For example, social media applications and internet of things (IoT) services may work with many small objects with a length of tens of bytes.

Because KV pair data includes a RP value, a controller, such as the controller 108 employ an optimized padding method that employs a tier based differential treatment, where KV pair data associated with a lower tier may be used as padding data for KV pair data associated with a higher tier. For example, KV pair data associated with a higher tier (i.e., tier 1) may have a RP value corresponding to "Best Performance" or "Better Performance", as shown in Table 1 above, and KV pair data associated with a lower tier (i.e., tier 2) may have a RP value corresponding to "Good Performance" or "Degraded Performance", as shown in Table 1 above. Therefore, KV pair data associated with the RP value corresponding to "Good Performance" or "Degraded Performance", as shown in Table 1 above, may be utilized as padding data for KV pair data associated with the RP value corresponding to "Best Performance" or "Better Performance", as shown in Table 1 above.

Referring to FIG. 4, value 3 408 may have an RP value corresponding with a lower tier (i.e., tier 2), whereas value 1a 404a, value 1b 404b, value 2 406, value 4 410, and value 5 412 each has an RP value corresponding with a higher tier (i.e., tier 1). Therefore, value 3 408 may be used in lieu of padding data to fill a remaining capacity of each FMU when the FMU has additional space due to the values having a size less than a size of the FMU. Because value 3 408 corresponds to actual data and not padding data, the capacity of the data storage device may not be impacted due to the available space being used to store padding data. In other words, the available space in each FMU is used to store data and not padding data.

The decision regarding which RP values out of the four RP values may be used for padding and which RP values out of the four RP values may be used as main data may be decided according to the RP values used. For example, if only values 00b-10b are used, then the lower tier (i.e., tier 2) may be associated with "Good performance" and the higher tier (i.e., tier 1) may be associated with "Better performance" and "Best performance". In another embodiment, there may be more than a lower tier and a higher tier. For example, there may be a higher tier (i.e., tier 1) and a plurality of lower tiers (i.e., tier 2+), where the plurality of lower tiers has a hierarchy. The plurality of lower tiers may be differentiated by a number of allowed fragments per value. For example, the value associated with a tier corresponding to "Degraded Performance" may not be limited in the number of allowed fragments, the value associated with a tier corresponding to "Good Performance" may be divided to up to 4 FMUs, and the value associated with a tier corresponding to "Better Performance" may have a maximum number of allowed fragments of two. Furthermore, values having a smaller size, such as values having a length of tens of bytes, may be classified as a lower tier.

Furthermore, values associated with a lower tier may be temporarily stored in volatile memory, such as the second volatile memory 150 or the volatile memory 112 of FIG. 1, or in SLC memory of an NVM, such as the NVM 110 of FIG. 1. In some examples, the values may be temporarily stored in a host memory buffer (HMB) of a host DRAM, such as the host DRAM 138 of FIG. 1, where the HMB is an allocated portion of the host DRAM for use by a controller, such as the controller 108 of FIG. 1.

Furthermore, the controller 108 may utilize two separate tables to track the KV pair data. For example, a first table may be utilized to track a key to a physical block address (K2P), where the physical block address is associated values corresponding to the higher tier. A second table may be utilized to track a key to multiple physical block addresses (K2MP), where the physical block addresses are associated with values corresponding to the lower tier. As the amount of values needed for padding (i.e., tier 2) may be significantly lower than the values that are a single key, the division of the two tables may ensure that the K2MP may be significantly smaller than the K2P in order to save memory storage space and reduce runtime complexity.

The controller 108 may further re-classify values of a higher tier (i.e., tier 1) as a lower tier (i.e., tier 2) and values of a lower tier (i.e., tier 2) as a higher tier (i.e., tier 1) based on data characteristics. For example, based on a read frequency of the value, the controller 108 may determine whether the value is "hot" or "cold". "Hot" may correspond to values having a high read frequency and "cold" may correspond to values having a low read frequency. The determining of "high" and "low" may be relative to a read frequency of other values stored in a same location of the NVM 110 or values having similar characteristics, such as patterns, descriptions, and the like.

For example, if a value is associated with a higher tier, but the controller 108 determines that the value is "cold", then the value may be demoted to the lower tier (i.e., tier 2). Thus, when the value is moved as part of a data management operation, the value may be used as padding data and temporarily stored in volatile memory (e.g., a buffer) or SLC memory before programming the value as padding data to two or more FMUs. Likewise, if a value is associated with a lower tier, but the controller 108 determines that the value is "hot", then the value may be promoted to the higher tier (i.e., tier 1). Thus, when the value is moved as part of a data management operation, the value may be programmed to one or more FMUs and not as padding data.

The controller 108 may either be addressed by a hint from the host device or may be dynamically learned during run time. For example, the dynamically learning may be completed using a predictive machine learning model that would predict which KV values or KV format will be read in the near future. Furthermore, the controller 108 may utilize a counter based approach by checking the amount of reads per KV format and using the format with the lowest count as the lower tier (i.e., tier 2).

In some embodiments, the tier 2 data may include internal data generated by the data storage device, where the tier 2 data is programmed in lieu of the padding data. The internal data may include logs, failure analysis data, debug data, and the like. Furthermore, the amount of internal data in the system may be adjusted. Thus, when the fragmentation is high, more internal data may be generated and utilized, and when fragmentation is low, less internal data may be generated and utilized.

Figure 5:
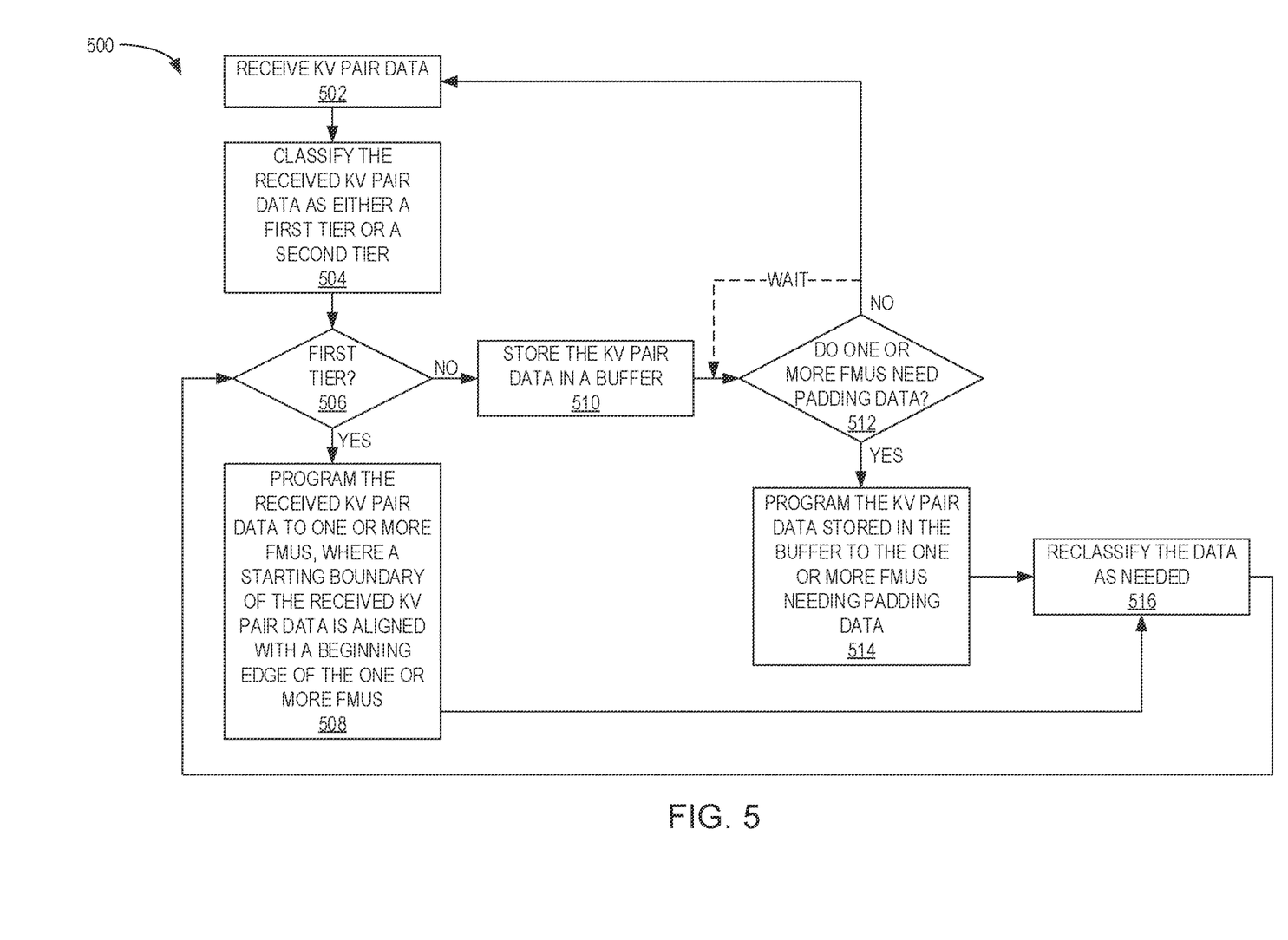
FIG. 5 is a flow diagram illustrating a method of optimized data alignment using KV pair data, according to certain embodiments.

FIG. 5 is a flow diagram illustrating a method 500 of optimized data alignment using KV pair data, according to certain embodiments. Aspects of FIG. 1 may be referenced herein for exemplary purposes. Method 500 may be implemented by the controller 108.

At block 502, the controller 108 receives KV pair data from the host device 104, where the KV pair data includes a key and a value. At block 504, the controller 108 classifies the received KV pair data as either a first tier or a second tier. The classifying may be based on a received hint from the host device 104, a RP value associated with the KV pair data, a type of the KV pair data, a length of the KV pair data, and the like. It is to be understood that there may be additional lower tiers that may be applicable to the described embodiments. At block 506, the controller 108 determines if the received KV pair data is classified as the first tier. If the received KV pair data is classified as the first tier at block 506, then the controller 108 programs the received KV pair data to one or more FMUs, where a starting boundary (e.g., starting address) of the received KV pair data is aligned with a beginning edge of the one or more FMUs, at block 508. However, if the received KV pair data is not classified as the first tier at block 506, but rather as a second tier (or lower, in some embodiments), the controller 108 stores the received KV pair data in a buffer at block 510. The buffer may be the volatile memory 150, the volatile memory 112, the buffer 116, SLC memory of the NVM 110, an HMB of the host device 104, and the like.

At block 512, the controller 108 determines if one or more FMUs that includes previously programmed data, such as KV pair data associated with the first tier, need padding data. If the controller determines that the one or more FMUs that includes previously programmed data does not need padding data at block 512, then method 500 returns to block 502 or waits until the one or more FMUs that includes previously programmed data needs padding data. However, if the one or more FMUs that includes previously programmed data needs padding data at block 512, the controller 108 programs the KV pair data stored in the buffer to the one or more FMUs that includes previously programmed data at block 514. In some embodiments, the data programmed to the one or more FMUs may be internal data or a mixture of internal data and KV pair data stored in the buffer. It is to be understood that the controller 108 may determine which KV pair data stored in the buffer may be programmed to the one or more FMUs that includes previously programmed data based on an amount of data needed to fill a remaining capacity of the one or more FMUs that includes previously programmed data. It is further to be understood that rather than one or more FMUs that includes previously programmed data, the described embodiments may be applicable to two or more FMUs that includes previously programmed data. Furthermore, it is to be understood that the embodiments described may include programming more than one lower tier KV pair data to one or more FMUs that includes previously programmed data or two or more FMUs that includes previously programmed data.

At block 516, the controller 108 reclassifies the stored KV pair data, where the reclassifying may occur dynamically, in response to a data management operation, after a threshold period of time has elapsed, after a threshold amount of new data has been stored, and the like. Method 500 returns to block 506, where the controller 108 determines whether the reclassified KV pair data is associated with the first tier.

By classifying KV pair data as either a higher tier or a lower tier, better data storage device utilization and data alignment may result, which may reduce an amount of overprovisioning of the data storage device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive key value (KV) pair data from a host device, wherein the KV pair data includes a key and a value;
determine whether the KV pair data corresponds to a first tier or a second tier, wherein the second tier has a lower performance requirement than the first tier; and
program the value of the KV pair data as padding data when the KV pair data corresponds to the second tier.

2. The data storage device of claim 1, wherein the KV pair data is stored in volatile memory when the KV pair data corresponds to the second tier prior to programming the value of the KV pair data as padding data.

3. The data storage device of claim 1, wherein:
the KV pair data includes a relative performance (RP) value;
the RP value is either a first value, a second value, a third value, or a fourth value;
the first value has a higher performance than the second value;
the second value has a higher performance than the third value; and
the third value has a higher performance than the fourth value.

4. The data storage device of claim 3, wherein the first tier corresponds to the first value and the second value, and wherein the second tier corresponds to the third value and the fourth value.

5. The data storage device of claim 1, wherein the controller is configured to:
reclassify the KV pair data as either:
the second tier when the KV pair data is classified as the first tier; or
the first tier when the KV pair data is classified as the second tier.

6. The data storage device of claim 5, wherein the reclassifying is based on a read frequency of the KV pair data.

7. The data storage device of claim 6, wherein the KV pair data that is reclassified as the second tier has a low read frequency, wherein the KV pair data that is reclassified as the first tier has a high read frequency.

8. The data storage device of claim 7, wherein the low read frequency and the high read frequency are determined relative to each read frequency of a plurality of KV pair data in the memory device.

9. The data storage device of claim 1, wherein the determining is based on a received hint from the data storage device.

10. The data storage device of claim 1, wherein the programming comprises splitting the KV pair data corresponding to the second tier over two or more flash management units (FMUs).

11. The data storage device of claim 10, wherein the two or more FMUs include KV pair data corresponding to the first tier.

12. A data storage device, comprising:
a memory device; and
a controller coupled to the memory device, wherein the controller is configured to:
receive first KV pair data from a host device, wherein KV pair data includes a key and a value;
classify the received first KV pair data as a first tier;
program the received first KV pair data to a first flash management unit (FMU), wherein the received first KV pair is less than a full size of a FMU;
receive second KV pair data from the host device;
classify the second KV pair data as a second tier, wherein the second tier has a lower performance requirement than the first tier; and
program at least a portion of the second KV pair data in an FMU that has KV pair data classified as the first tier previously stored in the FMU.

13. The data storage device of claim 12, wherein the at least a portion of the second KV pair data is programmed in the first FMU and a remaining portion of the second KV pair data is programmed to one or more previously programmed FMUs.

14. The data storage device of claim 12, wherein address information corresponding to KV pair data classified as the first tier is stored in a first table.

15. The data storage device of claim 14, wherein address information corresponding to KV pair data classified as the second tier is stored in a second table, and wherein the first table is distinct from the second table.

16. The data storage device of claim 15, wherein the first table stores a single address per value of the KV pair data classified as the first tier.

17. The data storage device of claim 15, wherein the second table stores two or more addresses per value of the KV pair data classified as the second tier.

18. The data storage device of claim 12, wherein the second KV pair data is stored in single level cell (SLC) memory prior to programming the at least a portion of the second KV pair data to the first FMU and a remaining portion of the second KV pair data to one or more previously programmed FMUs.

19. A data storage device, comprising:
memory means; and
a controller coupled to the memory means, wherein the controller is configured to:

program data associated with a second tier to one or more FMUs, wherein:
- the one or more flash management units (FMUs) comprises key value (KV) pair data associated with a first tier;
- the first tier has a higher performance requirement than the second tier; and
- the data associated with the second tier is utilized as padding data.

20. The data storage device of claim 19, wherein the data is either:
- KV pair data associated the second tier, wherein the KV pair data associated with the second tier has a relative performance (RP) value less than a RP of the KV pair data associated with the first tier; or
- internal data generated by the data storage device.

* * * * *